(12) United States Patent
Pine et al.

(10) Patent No.: US 11,745,831 B2
(45) Date of Patent: Sep. 5, 2023

(54) BAR GRIPPING ASSEMBLY

(71) Applicant: Get A Drift Outdoors Ltd, Oak Creek, CO (US)

(72) Inventors: Zakary Pine, Oak Creek, CO (US); Timothy Drummond, Oak Creek, CO (US)

(73) Assignee: GET A DRIFT OUTDOORS LTD, Oak Creek, CO (US)

( * ) Notice: Subject to any disclaimer, the term of this patent is extended or adjusted under 35 U.S.C. 154(b) by 0 days.

(21) Appl. No.: 16/948,007

(22) Filed: Aug. 27, 2020

(65) Prior Publication Data

US 2021/0053656 A1 Feb. 25, 2021

Related U.S. Application Data

(60) Provisional application No. 62/892,220, filed on Aug. 27, 2019.

(51) Int. Cl.
*B63B 17/00* (2006.01)
*B63B 25/00* (2006.01)

(52) U.S. Cl.
CPC ............ *B63B 17/00* (2013.01); *B63B 25/002* (2013.01)

(58) Field of Classification Search
CPC ....... B63B 17/00; B63B 25/002; F16B 7/048; F16B 2/08
See application file for complete search history.

(56) References Cited

U.S. PATENT DOCUMENTS

| | | | | |
|---|---|---|---|---|
| 7,594,631 | B1* | 9/2009 | Carnevali | B60R 11/0241 248/289.11 |
| 8,132,700 | B2* | 3/2012 | Dacko | B62J 11/00 224/427 |
| 8,387,939 | B2* | 3/2013 | Ford | F21V 21/088 362/474 |
| 8,840,078 | B2* | 9/2014 | DeWald | A47G 23/03 220/574 |
| 9,182,069 | B2* | 11/2015 | Haarburger | F16M 11/041 |
| 2003/0106919 | A1* | 6/2003 | Chuang | B62J 11/00 224/420 |

* cited by examiner

*Primary Examiner* — Anthony D Wiest

(74) *Attorney, Agent, or Firm* — DORSEY & WHITNEY LLP

(57) ABSTRACT

A bar gripping assembly is configured to join a bar to a marine accessory on a marine craft. The bar gripping assembly has a single piece housing having an upper housing portion and a lower housing portion. A marine accessory is formed as part of the upper housing portion. A first wall slot and a second wall slot are arranged through the lower housing portion. A hollow portion adjacent to a weakened wall on the lower housing portion that has a lower portion opening and an upper portion. A strap is arranged through the first wall slot, the second wall slot, and around the lower portion opening. The strap compresses the lower housing portion against the bar to join the marine accessory to the marine craft.

3 Claims, 5 Drawing Sheets

BAR GRIPPING ASSEMBLY

RELATED APPLICATION

This application claims priority to provisional patent application U.S. Ser. No. 62/892,220 filed on Aug. 27, 2019, the entire contents of which is herein incorporated by reference.

BACKGROUND

The embodiments herein relate generally to accessories for marine craft.

Prior to embodiments of the disclosed invention, secure mounting and holding of accessories onto pipes, tubes and bars was elusive. This problem was particularly pronounced on marine craft. Embodiments of the disclosed invention solve this problem.

SUMMARY

A bar gripping assembly is configured to join a bar to a marine accessory on a marine craft. The bar gripping assembly has a single piece housing having an upper housing portion and a lower housing portion. A marine accessory is formed as part of the upper housing portion. A first wall slot and a second wall slot are arranged through the lower housing portion. A hollow portion adjacent to a weakened wall on the lower housing portion that has a lower portion opening and an upper portion. A strap is arranged through the first wall slot, the second wall slot, and around the lower portion opening. The strap compresses the lower housing portion against the bar to join the marine accessory to the marine craft.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
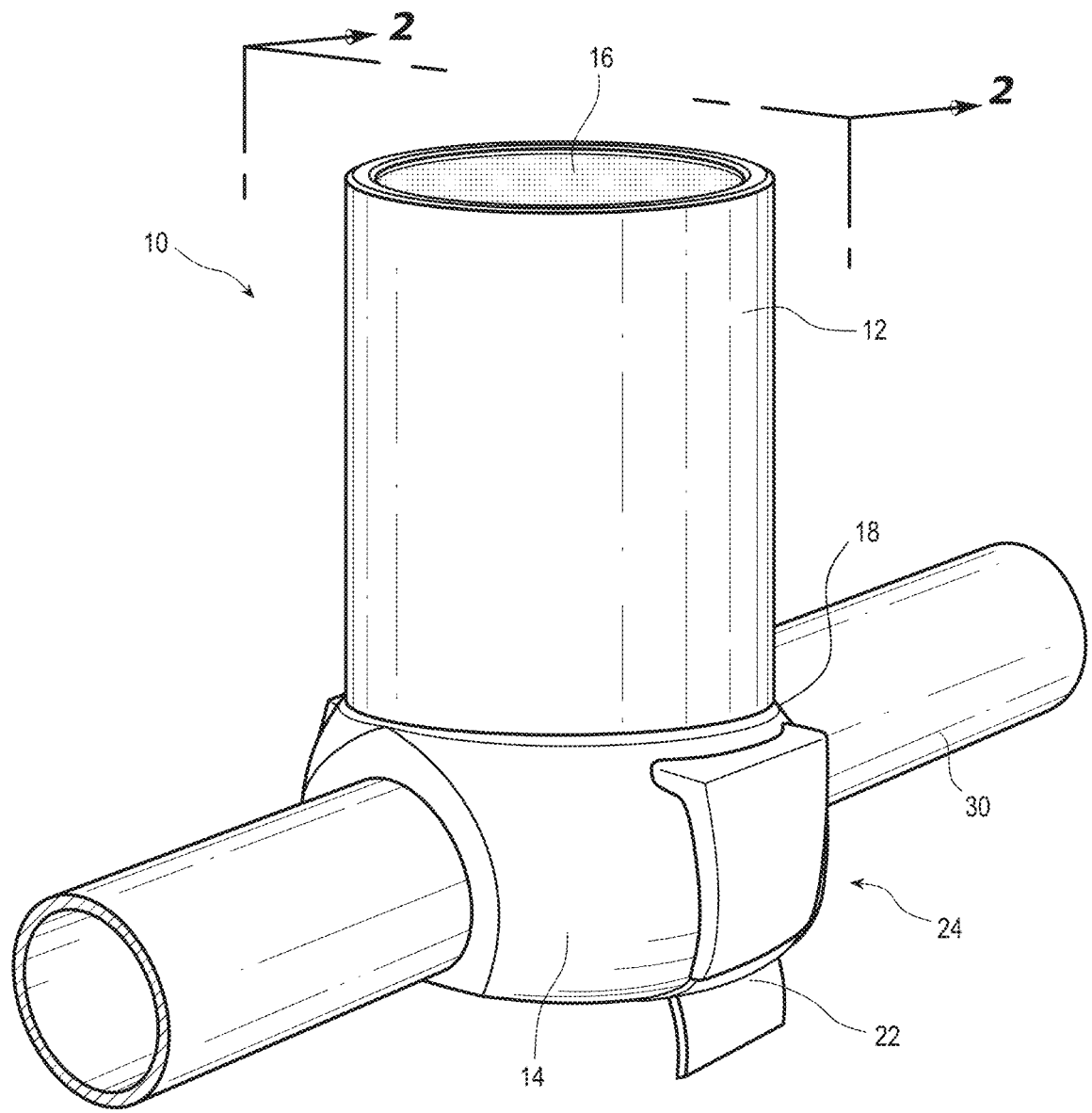
FIG. 1 shows a perspective view of one embodiment of the present invention.

By way of example, and referring to FIG. 1, one embodiment of a bar gripping assembly 10 further comprises an upper housing portion 12 joined to a lower housing portion 14. The upper housing portion 12 further comprises an upper opening 16.

Figure 2:
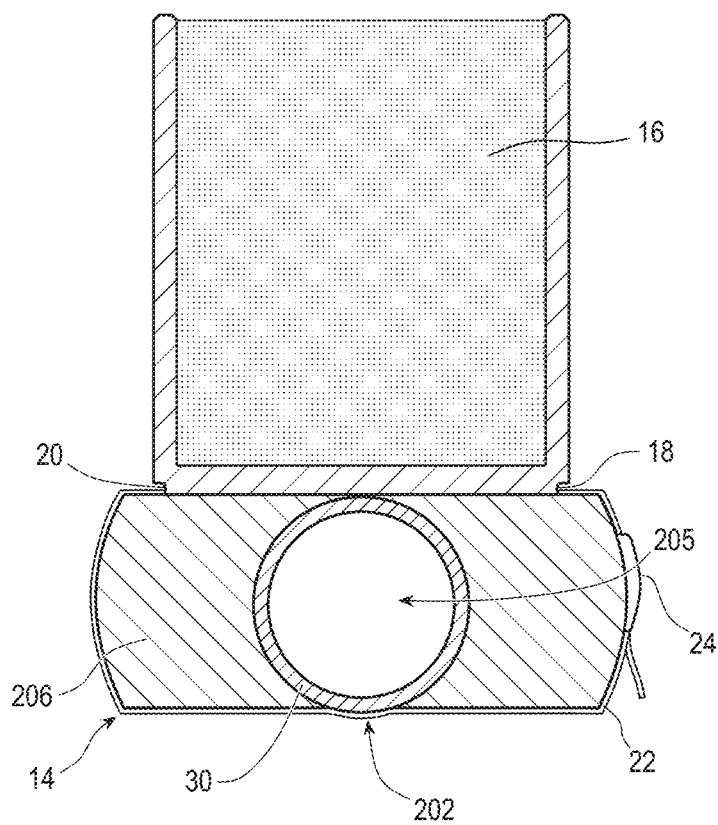
FIG. 2 shows a section view of one embodiment of the present invention taken along line 2-2.
Figure 2A:
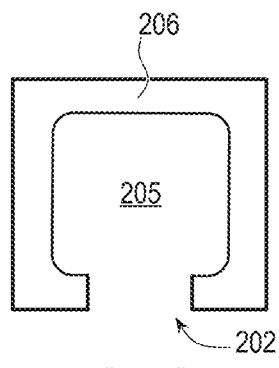
FIG. 2A shows a detail view of one embodiment of the opening of the present invention.
Figure 2B:
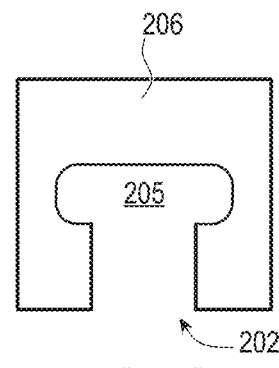
FIG. 2B shows a detail view of one embodiment of the opening of the present invention.
Figure 2C:
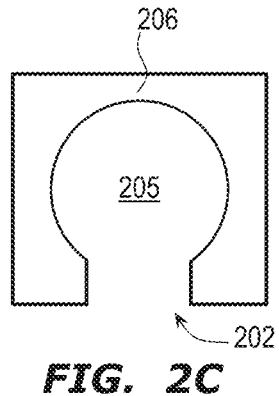
FIG. 2C shows a detail view of one embodiment of the opening of the present invention.
Figure 2D:
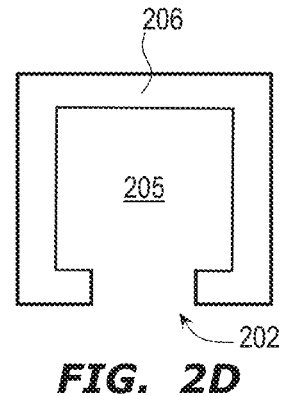
FIG. 2D shows a detail view of one embodiment of the opening of the present invention.

The lower housing portion 14 further comprises a first wall slot 18 and a second wall slot 20. A strap 22 is arranged through the first wall slot 18 and the second wall slot 20. The lower housing portion 14 further comprises a hollow portion 205 defined by walls 206. One of the walls 206 comprises a bottom wall defining a lower portion opening 202 into the hollow portion 205. As shown in FIG. 2, the lower housing portion 14 can be mounted to the bar 30 by slipping the bar 30 through the lower portion opening 202 and into the hollow portion 205. In some cases (as shown in FIG. 2), the lower portion opening 202 is dimensionally smaller than the bar 30, in which case the bottom wall and/or other walls of the walls 206 can deflect to allow insertion and withdrawal of the bar 30 from inside the hollow portion 205. A strap clamp 24 can be used to hold predetermined tension onto the strap 22, thereby securing the bar 30 against the lower portion housing 14.

Turning to FIGS. 2A-2D, a portion of the lower portion housing can have a number of cross section shapes such as a prism, a cone, a pyramid, a sphere, a hemisphere, a cube, a cuboid and other shapes. In each case, the cross-sectional shape comprises a bottom wall of the walls 206 having the lower portion opening 202. In specific implementations, at least the bottom wall of the walls 206 is structurally weakened to flexibly accommodate insertion and withdrawal of the bar 30 through the lower portion opening 20. Once the bar 30 is positioned at least partially inside the hollow portion 205 (as shown in FIG. 2), the strap 22 can hold the bar 30 against the walls 206.

Figure 3B:
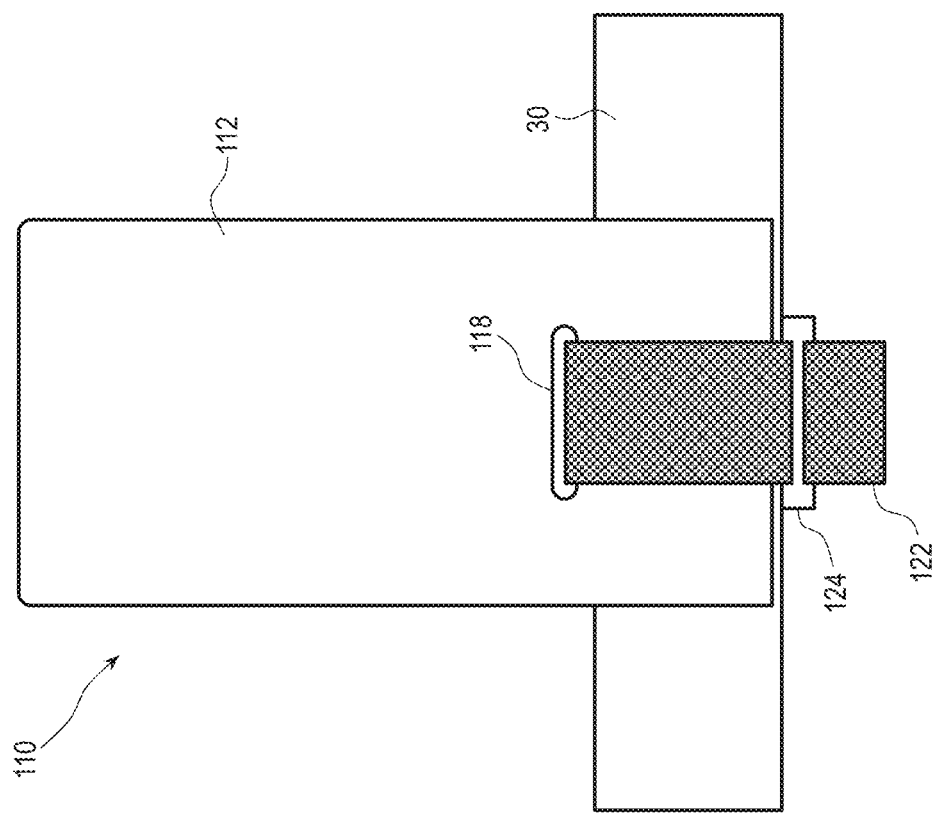
FIG. 3B shows a front view of one embodiment of the present invention.
Figure 3A:
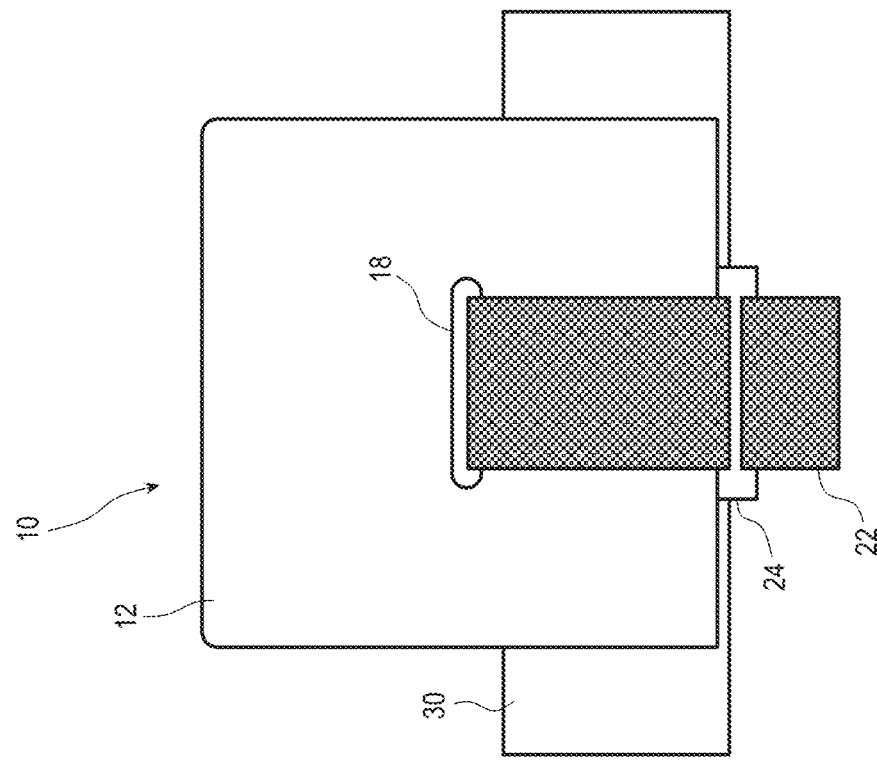
FIG. 3A shows a front view of one embodiment of the present invention.

Turning to FIG. 3B, a bar gripping assembly 110 further comprises an upper housing portion 112 joined to a lower housing portion. A strap 122 is arranged through a first wall slot 118 and a second wall slot in the upper housing portion 112. A strap clamp 124 can be used to hold predetermined tension onto the strap 122. Comparing FIGS. 3A and 3B it is apparent that different sized straps, lower housing portions and bars can be used in addition to the different shapes shown in FIGS. 2A-2D.

Figure 4:
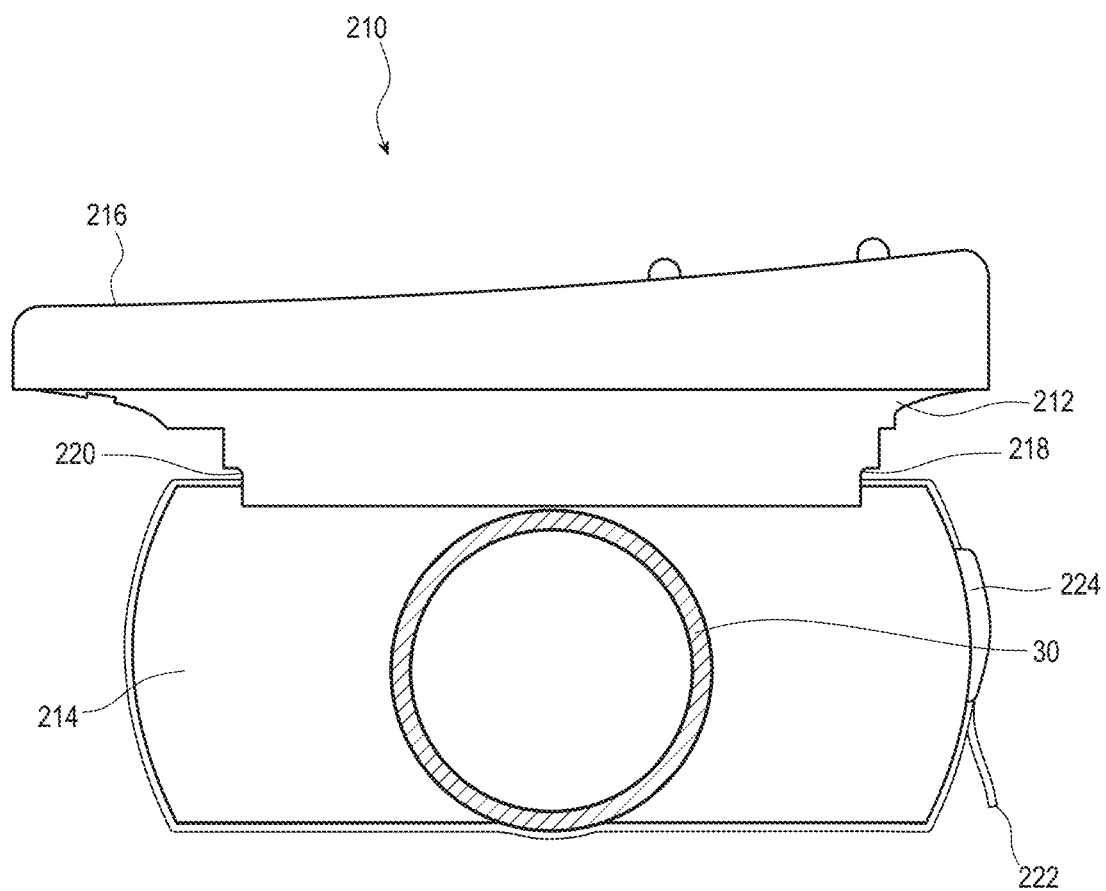
FIG. 4 shows a side elevation view, partly in section, of one embodiment of the present invention.

As shown in FIG. 4, a bar gripping assembly 210 further comprises an upper housing portion 212 joined to a lower housing portion 214. The upper housing portion 212 further comprises a fly or lure holder 216.

The lower housing portion 214 further comprises a first wall slot 218 and a second wall slot 220. A strap 222 is arranged through the first wall slot 218 and the second wall slot 220. The lower housing portion 214 further comprises a hollow portion adjacent to a weakened wall that has a lower portion opening and an upper portion. A strap clamp 224 can be used to hold predetermined tension onto the strap 222.

Figure 5:
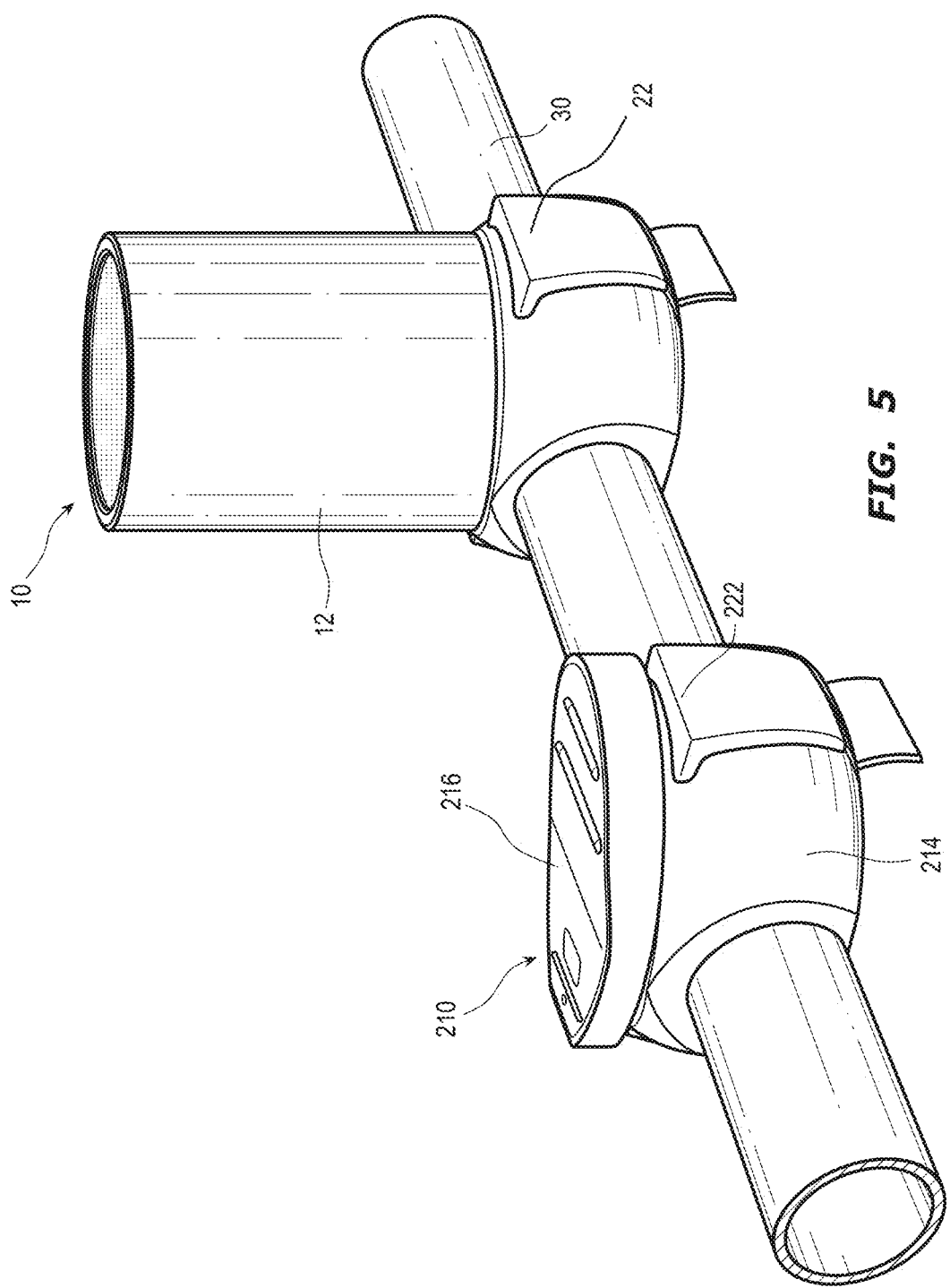
FIG. 5 shows a perspective view of one embodiment of the present invention.

FIG. 5 shows that a first bar gripping assembly 10 can be arranged next to a second bar gripping assembly 210 on a single bar 30. A fly holder, lure holder, and an upper opening are examples of a marine accessory. Marine accessories are collectively part of a group called accessories which also includes accessories found outside of the marine environment.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶16. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A bar gripping assembly to be secured to a bar of a vessel, comprising:
   a unitary, single piece housing, comprising:
   an upper housing portion having an upper opening configured to receive a marine accessory;
   a lower housing portion having a central aperture, comprising:
   a first wall structure extending from the lower housing;
   a second wall structure extending from the lower housing;
   wherein the first wall structure is positioned opposite the second wall structure to form the central aperture;
   wherein the first and second wall structures are weakened to allow the wall structures to flex;
   wherein the central aperture of the lower housing portion is positioned around a bar of a vessel;
   a first strap slot formed on the housing;
   a second strap slot formed the housing;
   a strap extending through the first strap slot and the second strap slot to secure the gripping assembly to the bar of the vessel, the strap being tightened to a predetermined tension to drawing the first wall structure toward the second wall structure, the strap contacting the bar to secure the bar gripping assembly to the bar; and
   a strap clamp to secure the strap in the predetermined tension in a desired position on the bar of the vessel.

2. The bar gripping assembly of claim 1, wherein the marine accessory is a fly.

3. The bar gripping assembly of claim 1, where the marine accessory is a lure.

* * * * *